(12) United States Patent
Miller (10) Patent No.: US 7,845,263 B1
(45) Date of Patent: Dec. 7, 2010

(54) BOMB RELEASE MECHANISM FOR RADIO-CONTROLLED AIRPLANE

(76) Inventor: Frank Miller, 21 Carriage Dr., Crawfordville, FL (US) 32327-2496

( * ) Notice: Subject to any disclaimer, the term of this patent is extended or adjusted under 35 U.S.C. 154(b) by 317 days.

(21) Appl. No.: 12/283,805

(22) Filed: Sep. 16, 2008

Related U.S. Application Data (60) Provisional application No. 61/011,670, filed on Jan. 18, 2008.

(51) Int. Cl.
   *B64D 1/04* (2006.01)
(52) U.S. Cl. .................. 89/1.56; 244/137.4; 446/34
(58) Field of Classification Search .............. 89/1.51, 89/1.54, 1.55, 1.56, 1.59, 1.5; 244/1 R, 189, 244/190, 904, 94, 137.4; 446/34
   See application file for complete search history.

(56) References Cited

U.S. PATENT DOCUMENTS

| | | | | |
|---|---|---|---|---|
| 2,462,883 A | * | 3/1949 | Milde ...................... 361/195 |
| 2,474,841 A | * | 7/1949 | Hatfield ................... 89/1.51 |
| 2,490,816 A | * | 12/1949 | Kiebert, Jr. ................ 342/61 |
| 2,741,158 A | * | 4/1956 | Stein ....................... 89/1.51 |
| 2,991,700 A | * | 7/1961 | Sholtz ...................... 89/1.51 |
| 3,598,015 A | * | 8/1971 | Delistovich et al. ........ 89/1.814 |
| 3,613,589 A | * | 10/1971 | Apstein et al. ............. 89/1.55 |
| 3,619,792 A | * | 11/1971 | Capeci et al. .............. 327/141 |
| 4,194,708 A | * | 3/1980 | Tracy et al. .................... 244/15 |
| 4,520,975 A | * | 6/1985 | Blackhurst ................ 244/137.4 |
| 4,732,074 A | * | 3/1988 | Normand ..................... 89/1.51 |
| 5,092,542 A | * | 3/1992 | Ellis et al. ................ 244/137.4 |
| 5,248,233 A | * | 9/1993 | Webster ...................... 411/433 |
| 6,035,759 A | * | 3/2000 | Jakubowski et al. ......... 89/1.54 |
| 6,450,064 B1 | * | 9/2002 | Christiansen et al. ....... 74/572.2 |
| 6,584,880 B1 | * | 7/2003 | Pahl et al. ..................... 89/1.55 |
| 6,796,124 B2 | * | 9/2004 | Kutlucinar .................... 60/528 |
| 6,941,850 B1 | * | 9/2005 | McMahon .................. 89/1.811 |
| 7,083,148 B2 | * | 8/2006 | Bajuyo et al. ............. 244/137.4 |
| 7,377,470 B2 | * | 5/2008 | Miyake ...................... 244/190 |
| 7,464,634 B1 | * | 12/2008 | Shah et al. ..................... 89/1.8 |
| 7,503,525 B1 | * | 3/2009 | Lam et al. ................ 244/137.4 |
| 7,677,501 B1 | * | 3/2010 | Hundley et al. ........... 244/137.4 |
| 2005/0183570 A1 | * | 8/2005 | McMahon .................. 89/1.811 |
| 2006/0283315 A1 | * | 12/2006 | Blackburn .................. 89/1.54 |
| 2007/0018052 A1 | * | 1/2007 | Eriksson ..................... 244/190 |
| 2007/0084971 A1 | * | 4/2007 | Miyake ...................... 244/190 |
| 2008/0035785 A1 | * | 2/2008 | Grabmeier ................... 244/3.1 |

* cited by examiner

*Primary Examiner*—Benjamin P Lee
(74) *Attorney, Agent, or Firm*—J. Wiley Horton (57) ABSTRACT

A new bomb release mechanism which allows an RC aircraft to carry an unlimited number of model bombs. The new bomb release mechanism allows the pilot to release these model bombs in any sequence using only one unused channel on the receiver in the aircraft. The present invention accomplishes these objectives by employing a special alloy metal wire which shrinks when subjected to an electric current. A programmed circuit is used to energize the metal wire upon receipt of the designated control signal.

18 Claims, 7 Drawing Sheets

FIG. 7

BOMB RELEASE MECHANISM FOR RADIO-CONTROLLED AIRPLANE

CROSS-REFERENCES TO RELATED APPLICATIONS

This application claims the benefit of U.S. Provisional Application No. 61/011,670 which was filed on Jan. 18, 2008. The provisional application listed the same inventor.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of bomb release systems for Radio Control aircraft. More specifically, the present invention comprises a bomb release system for model aircraft which allows numerous bombs to be released from the airborne aircraft in any sequence on command by an operator using a single channel.

2. Description of the Related Art

Radio Control ("RC") aircraft hobbyists enjoy piloting RC aircraft to simulate the flight of traditional manned aircraft. Some hobbyists enjoy equipping RC aircraft with powder-filled break-apart model bombs and dropping these bombs in flight on targets placed on the ground. These powder-filled model bombs break apart when they strike the ground leaving the powder on the ground at the point of impact. It is the pilot's goal to time the release of the model bombs such that they strike as close to the target as possible.

Bomb release mechanisms have been used for many years on RC aircraft. Conventional bomb release mechanisms utilize servos, solenoids or pneumatics to actuate the release of a model bomb in flight. Servo controlled mechanisms limit the number of releasable bombs to the number of "extra" channels available on the RC controller (i.e., channels not dedicated to flight operations). For most RC aircraft, only one or two extra channels are available.

Solenoid controlled systems are capable of controlling the release of multiple bombs using only one control channel. In order to actuate independent release of the bombs, a master controller box is used. Each release mechanism requires a separate wiring harness to connect the release mechanism to the master controller box. Thus, the master controller box can only control a defined (and usually small) number of release mechanisms. Due to the high current demands of this type of system, a separate high current battery is generally required to power the solenoids.

Pneumatic actuator systems also use a single channel, but the channel must be a rotary control channel to allow for precise positioning of a multi-port air valve. This type of system also requires a high pressure air tank, tubing, actuators and a mechanical bomb release. These mechanisms are relatively heavy compared to the weight of an RC aircraft.

As such, a new bomb release mechanism is needed to allow a user to control the timing and sequence of release of numerous model bombs from an RC aircraft.

BRIEF SUMMARY OF THE INVENTION

The present invention is a new bomb release mechanism which allows an RC aircraft to carry an unlimited number of model bombs. The new bomb release mechanism allows the pilot to release these model bombs in any sequence using only one unused channel on the receiver in the aircraft. The present invention accomplishes these objectives by employing a special alloy metal wire which shrinks when subjected to an electric current. A programmed circuit is used to energize the metal wire upon receipt of the designated control signal.

| REFERENCE NUMERALS IN THE DRAWINGS | | | |
|---|---|---|---|
| 10 | release assembly | 12 | carriage |
| 14 | circuit board | 16 | screw connectors |
| 18 | block | 20 | pins |
| 22 | switch | 24 | holder |
| 26 | spring | 28 | pin |
| 30 | pulley | 32 | surface |
| 34 | adjustment rod | 36 | relief |
| 38 | rod tip | 40 | bomb slots |
| 42 | holder clips | 44 | leads |
| 46 | NITINOL wire | 48 | fix point |
| 50 | fix point | 52 | bomb casing |
| 54 | powder | 56 | bomb clips |
| 58 | mount screw | 60 | mount bore |
| 62 | spacer | 64 | channels |
| 66 | conductive strip | | |

DETAILED DESCRIPTION OF THE INVENTION

Figure 1:
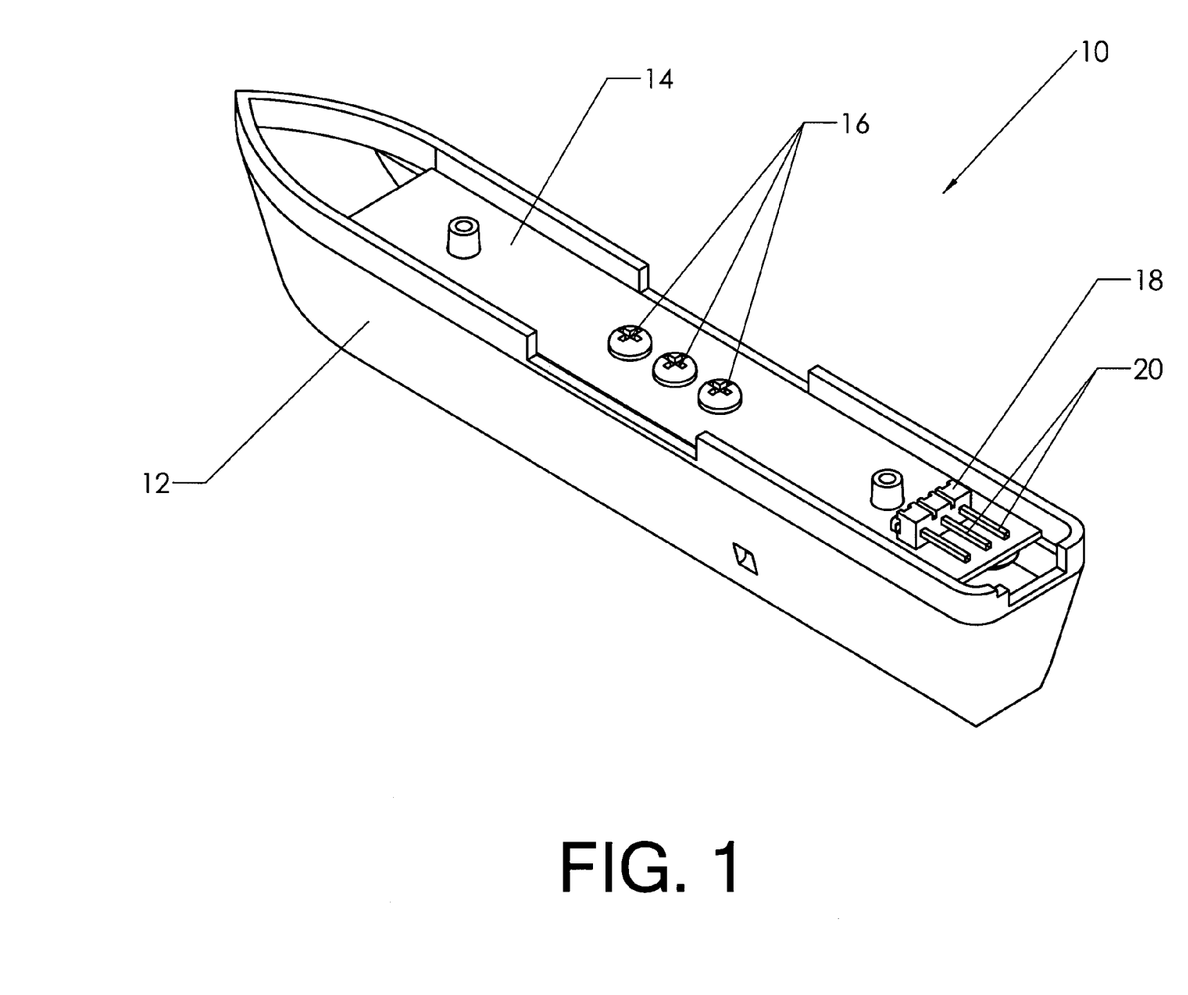
FIG. 1 is a perspective view, showing the present invention.

The present invention, release assembly 10, is shown in its assembled state in FIG. 1. Release assembly 10 includes circuit board 14 which nests in the top portion of carriage 12. Circuit board 14 includes block 18 which has pins 20. Pins 20 of block 18 electrically connect to a Radio Control ("RC") aircraft's radio signal receiver directly (for one or a single row of release mechanisms) or via a "Y" wiring harness to create two rows of physically separated release mechanisms. The latter is most common with fixed-wing aircraft to afford a balanced load under each wing. In either case, the user would connect a wiring harness to an unused channel on the radio receiver.

Figure 7:
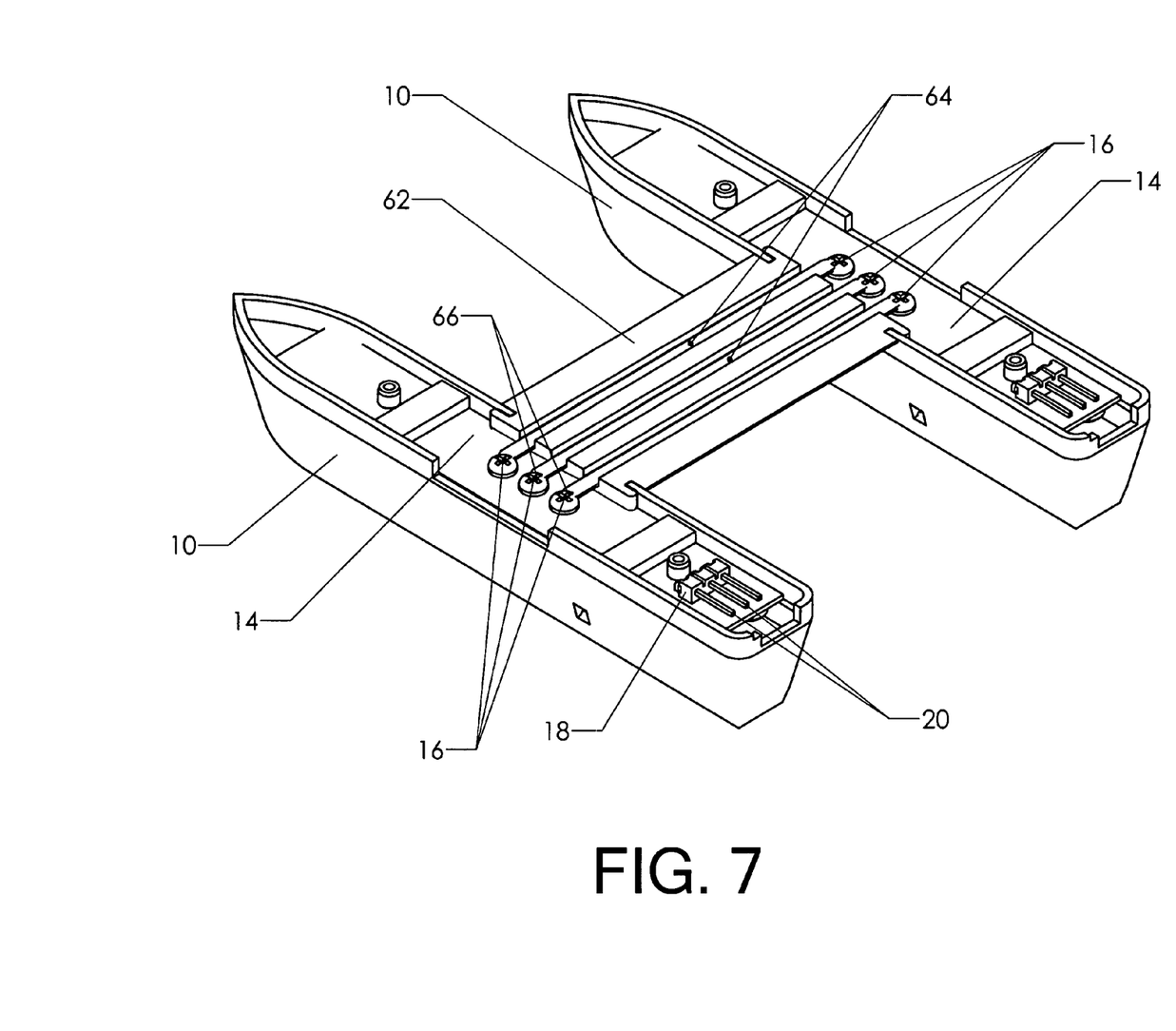
FIG. 7 is a perspective view, illustrating two adjacent release assemblies.

The electric circuit embedded in circuit board 14 is configured to pass the control signals received via pins 20 to screw connectors 16. Screw connectors 16 are provided on the top of circuit board 14 to facilitate a common parallel electrical bus for additional release mechanisms within the row. Rigid metal straps are attached to screw connectors 16 to relay control signals sent from the radio receiver to release assembly 10 to other bomb release assemblies on the aircraft (such as shown in FIG. 7). The plurality of release assemblies may be connected in series or parallel. The most common connection method would have a "Y" harness attached to the radio receiver to supply common signals to two release mechanisms (one on each wing) connected each at pins 20. From this point, an unlimited number of release mechanisms could be connected in a serial fashion utilizing screw connectors 16. Thus, the reader will appreciate that any number of release assemblies may be employed on the aircraft.

A second part of the electric circuit of circuit board 14 processes the control signal to determine whether the user has transmitted a "release bomb" control signal corresponding to the particular release assembly. Each release mechanism is pre-programmed with an "activate number" (e.g., 1, 2, 3 . . . 255) by the operator into non-volatile memory and the activate number will stay in the memory until changed. When the user transmits a "release bomb" control signal, all release mechanisms hear it and count it. Immediately after a count is received, the total count is compared to the programmed "activate number." When a match occurs, the electronic circuit will activate the release mechanism to release the bomb.

Figure 2:
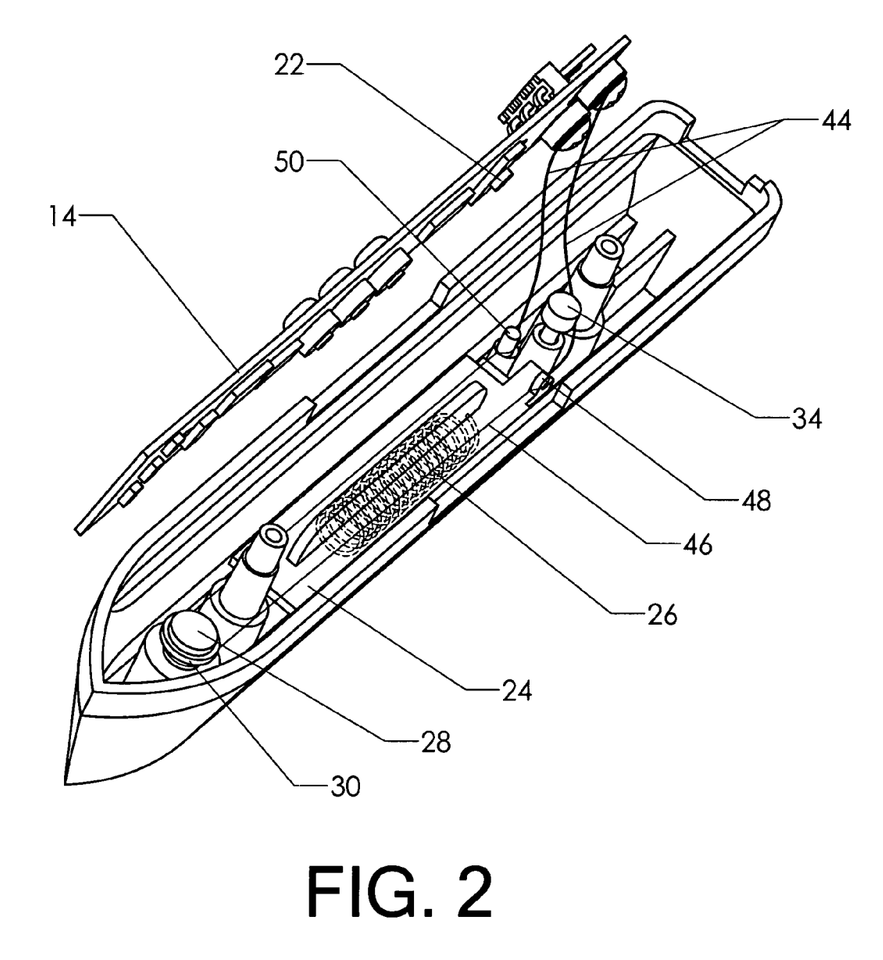
FIG. 2 is a perspective view, showing the present invention.
Figure 6:
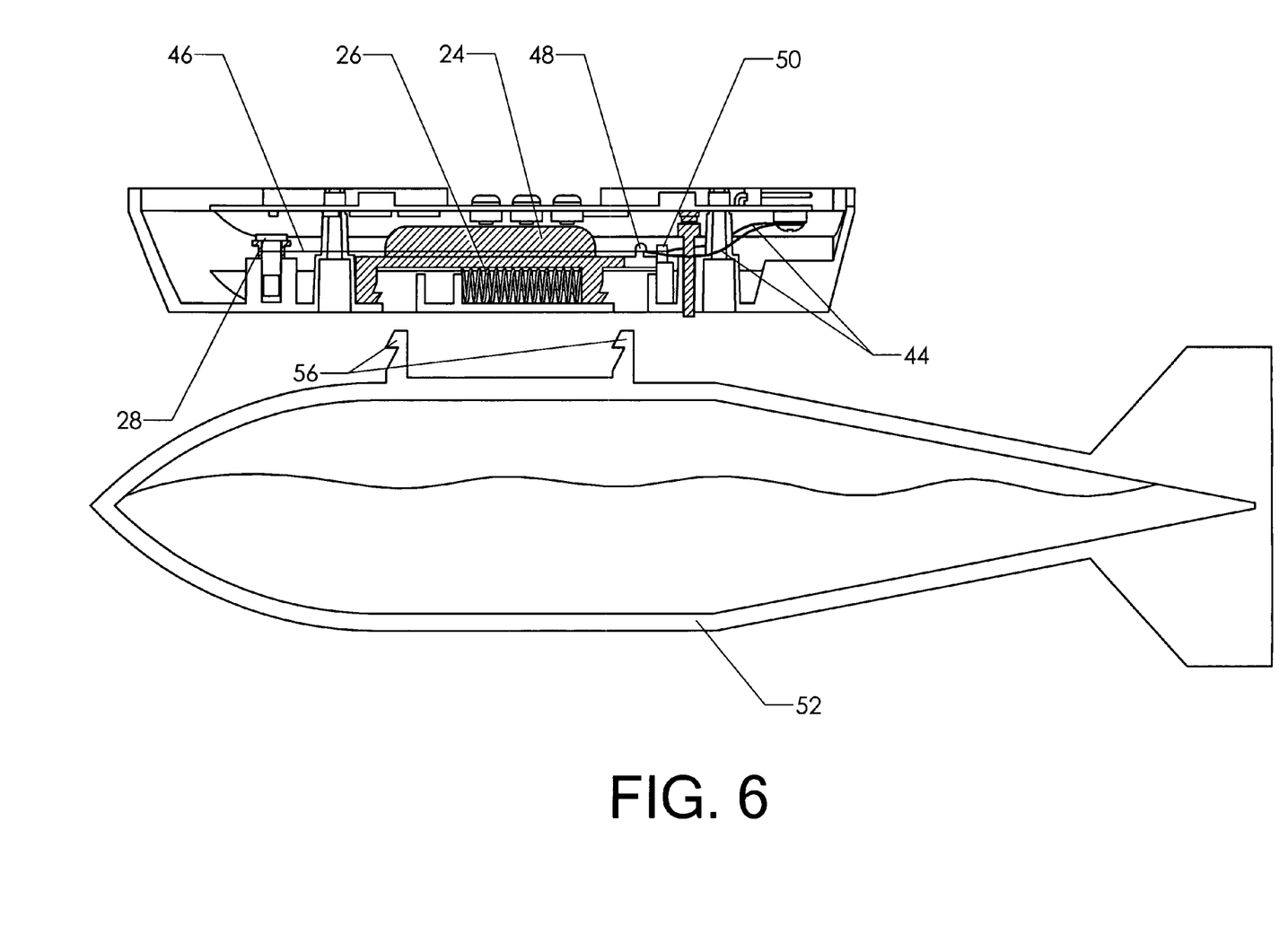
FIG. 6 is a section view, illustrating operation of the present invention.

FIG. 2 shows the release assembly with circuit board 14 removed from carriage 12 to show the internal components of the release assembly. Holder 24 is situated in the bottom of carriage 12. Holder 24 moves forward and backward within carriage 12 (toward and away from pin 28). Holder 24 is biased (by a spring or other suitable component) to remain in the rearward position until circuit board 14 transmits an energizing charge to NITINOL wire 46 via leads 44. NITINOL wire 46 is composed of a nickel titanium alloy which is known to shrink in length when subjected to an electric current. NITINOL wire 46 may be replaced by any component that is known to change its shape or size when subjected to a current. NITINOL wire 46 attaches to fix point 48 on holder 24 and fix point 50 (which is fixed to carriage 12). NITINOL wire 46 wraps around pulley 30 which is attached to pin 28. Since NITINOL wire only shrinks approximately 3-5% of its length, pulley 30 allows a longer NITINOL wire to be employed, thereby enabling a greater range of movement of holder 24 to affect a clean release of bomb clips 56 (The released position is shown in FIG. 6). When the circuit is activated, the NITINOL wire shrinks and pulls holder 24 forward with respect to carriage 12, thereby releasing the bomb.

Also shown in FIG. 2 is "normally open" momentary pushbutton switch 22 and adjustment rod 34. Switch 22 is placed on the bottom of circuit board 14 and is used to program an identity to each release assembly. The microcontroller program routine tracks how many times switch 22 is pressed and maps the total number of switch closures into the microchip's non-volatile memory. Each release assembly is programmed with this release code by the user based on the sequence and position of each bomb to be sequentially dropped. For example, the first release assembly may have an identity of ONE, the second release assembly may have an identity of TWO, the third release assembly may have an identity of THREE, and so on. In this example, the first release assembly will release its payload on receipt of the first "release bomb" signal, the second release assembly will release its payload on receipt of the second "release bomb" signal, the third release assembly will release its payload on receipt of the third "release bomb" signal, and so on. Alternatively, multiple release assemblies may be assigned the same identity to cause the release assemblies to drop their payloads simultaneously upon receipt of a single control signal.

Figure 3:
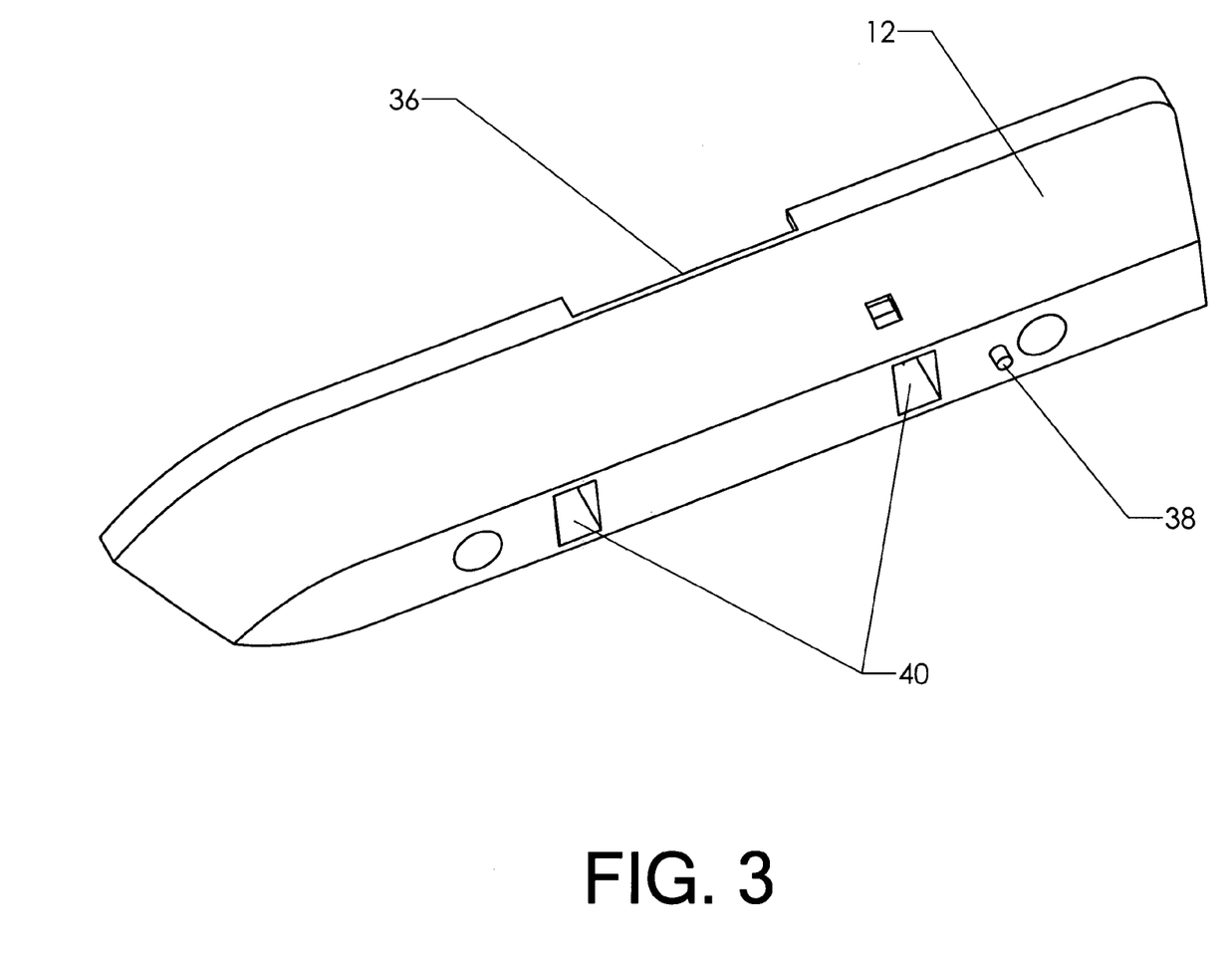
FIG. 3 is a perspective view, showing the present invention.

Adjustment rod 34 is slidably situated in a molded sleeve beneath switch 22. Turning to FIG. 3, the reader will note that rod tip 38 is provided in the bottom of carriage 12 where the pushbutton's switch adjustment rod 34 extends just below carriage 12 long enough for a finger to push and cause switch closure. The user pushes the adjustment rod 34 into switch 22, thereby entering desired settings without having to disassemble the device.

In FIG. 3, the reader will further note that relief 36 is provided on both sides at the top of carriage 12 adjacent to screw connectors 16. This allows for the attachment of a molded connector to physically connect additional release mechanisms at the proper spacing on either sides (providing sufficient clearance such that adjacent bombs do not touch). Turning to FIG. 7, one such connector is illustrated. Spacer 62 attaches between two adjacent release assemblies 10. Spacer 62 has three channels 64 which extend along the length of the spacer. Channels 64 extend between screws 16 on the two adjacent release assemblies 10 when spacer 62 is attached within relief 36. Conductive strips 66 are situated within channels 64 and are attached to each circuit board 14 by screw 16. As such conductive strips 66 provide an electrically conductive pathway for relaying control signals between adjacent bomb assemblies 10.

Figure 4:
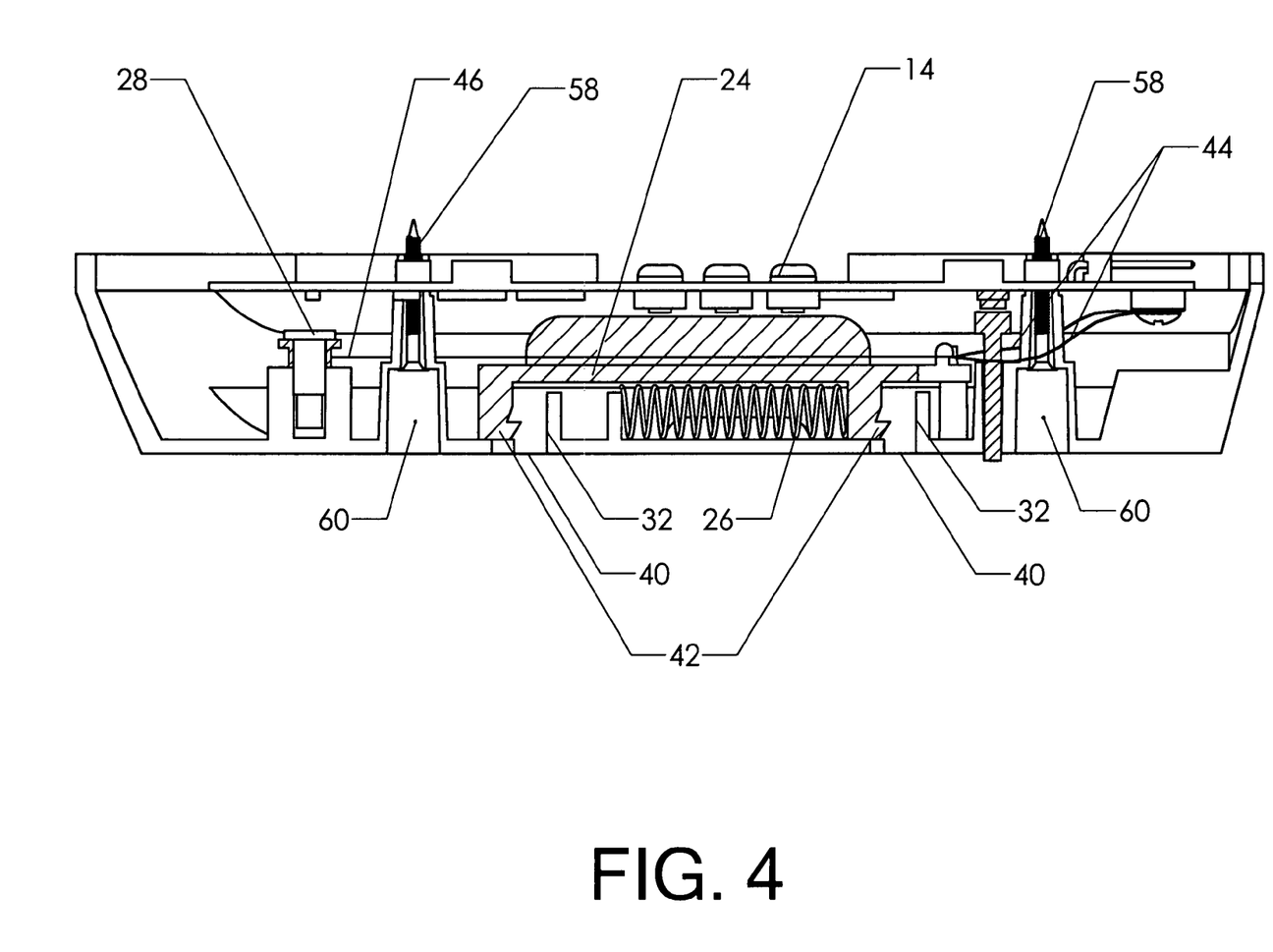
FIG. 4 is a section view, showing the present invention.

As shown in FIG. 4, bomb slots 40 are provided in the bottom of carriage 12 to receive the matching serrated mating clips of model bombs. Holder 24 has a pair of holder clips 42 which are positioned above bomb slots 40. Spring 26 exerts a force on holder 24 biasing holder 24 toward the right in the orientation shown in the view (which is actually toward the rear of the carriage).

Figure 5:
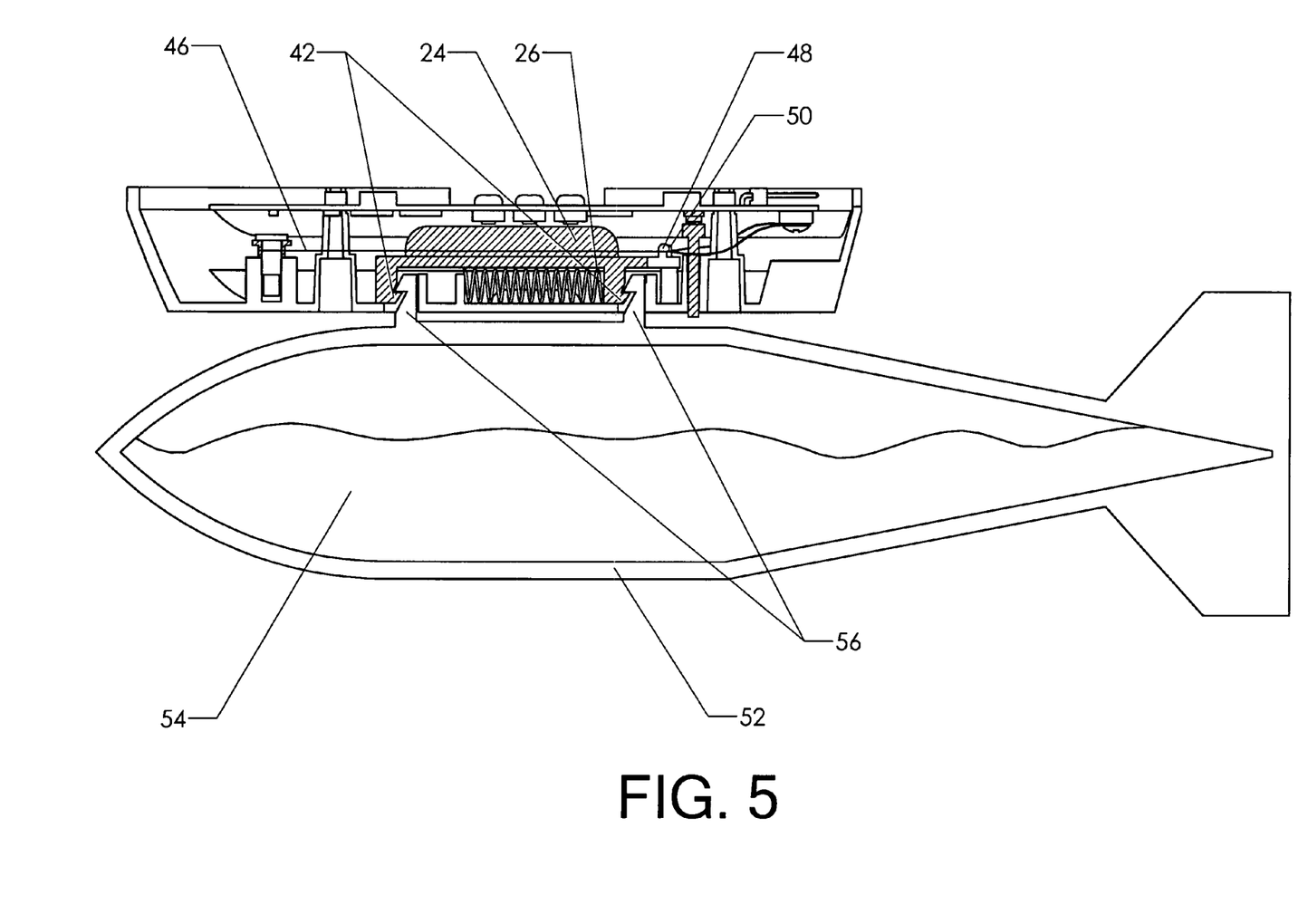
FIG. 5 is a section view, illustrating operation of the present invention.

Turning to FIG. 5, a representative model bomb is shown attached to carriage 12. The model bomb has a break-apart bomb casing 52 which can optionally be filled with powder 54 or other desired contents. Powder 54 may be talcum powder, flour, baking soda, or any other substance suitable for marking the bomb's impact point. Bomb clips 56 are provided on one side of bomb casing 52. Bomb clips 56 insert into bomb slots 40 and engage holder clips 42 of holder 24. When holder 24 is in the illustrated position, the model bomb is securely held to the model aircraft by holder 24. Bomb clips 56 of the model bomb are clamped between holder clips 42 and surfaces 32 (labeled in FIG. 4) which are integrated into the base of the internal cavity of carriage 12.

FIG. 6 illustrates release of the model bomb. When the appropriate "release bomb" control signal is received, circuit board 14 energizes NITINOL wire 46 via leads 44. Leads 44 are electrically connected to NITINOL wire 46 at fix points 48 and 50. When energized, NITINOL wire 46 shrinks to approximately 95% of its original length. Fix point 50 remains fixed, but the tensile force exerted by the shrinking of NITINOL wire 46 pulls holder 24 forward toward pin 28. This tensile force is sufficient to compress spring 26 and provide sufficient clearance for bomb clips 56 of the model bomb to drop through bomb slots 40 when bomb clips 56 disengage from holder clips 42.

With the present invention now described, the reader can appreciate how the present invention is used. The user first electrically connects one or more release assemblies to an unused channel of the model aircraft's radio receiver as previously described. The release assemblies are then attached to the aircraft at the desired locations. Turning to FIG. 4, the reader will note that the release assembly may be mounted to the aircraft with mount screws 58 which pass through mount bores 60. Each release assembly is then assigned a desired identity by pushing on adjustment rod 38 an appropriate number of times. Model bombs are then filled with an appropriate substance (or left empty) and attached to the respective holders 24 by inserting bomb clips 56 into bomb slots 40. The model bombs are now ready for release.

The user then flies the RC aircraft using the normal flight controls of the RC transmitter. The user may then take aim at targets placed on the ground and actuate the release of the model bombs in the desired sequence using the appropriate control button on the RC corresponding to the channel employed for the bomb release assemblies. The user drops each payload in the programmed sequence. If the release assemblies were programmed as previously described (i.e. the first release assembly given the identity of ONE, the second release assembly given the identity of TWO, etc.), the first release assembly will drop its payload upon the transmission of the first "release bomb" signal transmitted on the channel. The second release assembly will drop its payload upon the transmission of the second "release bomb" signal transmitted on the channel.

The reader should now appreciate that no master controller is needed to coordinate the release of the model bombs using the present invention. Each release mechanism operates independently, allowing the user to easily add or remove bomb release assemblies to the aircraft when desired. Thus, the controller for each release assembly is contained on circuit board 14. The circuit board includes a microprocessor, a voltage regulator, a thermistor and a MOS power switch. The microprocessor counts "release bomb" command signals, and when the number of command signals received is equal to its identity, the microprocessor actuates the MOS power switch to energize NITINOL wire 46.

In one embodiment, the microprocessor stores in its memory the number of times switch 22 is pressed. The electrical signal passing to each release assembly through the wiring harnesses are pulses that vary between 1.0 ms and 2.0 ms in length. The controller is configured to remain idle if the pulse length is smaller than 1.8 ms. If the controller sees a signal that exceeds 1.8 ms, the controller interprets this as a "release bomb" signal. Before releasing its payload, the controller first compares the "release bomb" signal count to the number of times switch 22 was pressed during the programming stage. If there is no match, nothing happens and the circuit continues to monitor for more pulses that are over 1.8 ms. If any particular release assembly has the same identity as the signal count, the controller energizes the NITINOL wire for that assembly.

In addition to interpreting control signals and actuating the release of its payload, each release assembly also monitors the main receiver battery for critical low voltage. When a specific low voltage is measured, each circuit shuts down until it has been turned off and back on again. This prevents the circuit from further reducing battery voltage which could cause a crash of the aircraft due to battery failure.

The preceding description contains significant detail regarding the novel aspects of the present invention. It should not be construed, however, as limiting the scope of the invention but rather as providing illustrations of the preferred embodiments of the invention. Thus, the scope of the invention should be fixed by the following claims, rather than by the examples given.

Having described my invention, I claim:

1. A bomb release mechanism for releasing a model bomb from a radio-controlled aircraft, said radio-controlled aircraft having a receiver for receiving commands from a pilot on the ground, comprising:
   a. a holder configured to move between a first position in which said model bomb is securely attached to said bomb release mechanism and a second position in which said model bomb is released from said bomb release mechanism;
   b. a metal wire attached to said holder, said metal wire configured to shrink when subjected to an electric current and thereby move said holder from said first position to said second position when subjected to said electric current;
   c. a controller configured to supply said electric current to said metal wire upon receipt of a control signal.

2. The bomb release mechanism of claim 1, said metal wire comprising a nickel titanium alloy.

3. The bomb release mechanism of claim 1, said controller comprising a programmed circuit, said programmed circuit configured to count a quantity of bomb release control signals transmitted on a channel of said receiver and compare said quantity of bomb release control signals transmitted with a programmed value, said programmed circuit configured to supply said electric current to said metal wire when said quantity of bomb release control signals is equivalent to said programmed value.

4. The bomb release mechanism of claim 3, said programmed circuit having a switch configured to change said programmed value when actuated.

5. The bomb release mechanism of claim 1, said controller having a switch for assigning said controller a unique identity.

6. The bomb release mechanism of claim 1, wherein said controller is further configured to monitor a battery voltage for said radio-controlled aircraft.

7. The bomb release mechanism of claim 1, further comprising:
   a. a second holder configured to move between a third position in which a second model bomb is securely attached to said second holder and a second position in which said second model bomb is released from said second holder;
   b. a second metal wire attached to said second holder, said second metal wire configured to shrink when subjected to a second electric current and thereby move said second holder from said third position to said fourth position when subjected to said second electric current;
   c. a second controller configured to supply said second electric current to said second metal wire upon receipt of a second control signal.

8. The bomb release mechanism of claim 7, said second controller electrically connected to said first controller.

9. The bomb release mechanism of claim 8, wherein said controller and said second controller and independently programmable, wherein said controller and said second controller receive said control signal and said second control signal, and wherein said controller and said second controller each independently evaluate said control signal and said second control signal to determine whether an appropriate signal has been transmitted for releasing said model bomb or said second model bomb.

10. A bomb release mechanism for releasing a model bomb from a radio-controlled aircraft, said radio-controlled aircraft having a receiver for receiving commands from a pilot on the ground comprising:
   a. a holder configured to move between a first position in which said model bomb is securely attached to said bomb release mechanism and a second position in which said model bomb is released from said bomb release mechanism;
   b. a controller configured to actuate the movement of said holder from said first position to said second position;
   c. a programmed circuit configured to monitor a channel of said receiver for bomb release control signals, said programmed circuit configured to count a quantity of bomb release control signals transmitted on said channel of said receiver and compare said quantity of bomb release control signals transmitted with a programmed value, said programmed circuit configured to actuate the movement of said holder from said first position to said second position when said quantity of bomb release control signals is equivalent to said programmed value.

11. The bomb release mechanism of claim 10, further comprising a metal wire attached to said holder, said metal wire configured to shrink when subjected to an electric current and thereby move said holder from said first position to said second position when subjected to said electric current, and wherein said controller is configured to supply said electric current to said metal wire upon receiving said quantity of bomb release control signals equivalent to said programmed value.

12. The bomb release mechanism of claim 11, said metal wire comprising a nickel titanium alloy.

13. The bomb release mechanism of claim 10, said programmed circuit having a switch configured to change said programmed value when actuated.

14. The bomb release mechanism of claim 10, said controller having a switch for assigning said controller a unique identity.

15. The bomb release mechanism of claim 10, wherein said controller is further configured to monitor a battery voltage for said radio-controlled aircraft.

16. The bomb release mechanism of claim 10, further comprising:

a. a second holder configured to move between a third position in which a second model bomb is securely attached to said second holder and a fourth position in which said second model bomb is released from said second holder;

b. a second controller configured to actuate the movement of said second holder from said third position to said fourth position;

c. a second programmed circuit configured to monitor said channel of said receiver for bomb release control signals, said programmed circuit configured to count said quantity of bomb release control signals transmitted on said channel of said receiver and compare said quantity of bomb release control signals transmitted with a second programmed value, said second programmed circuit configured to actuate the movement of said second holder from said third position to said fourth position when said quantity of bomb release control signals is equivalent to said second programmed value.

17. The bomb release mechanism of claim 16, said second controller electrically connected to said first controller.

18. The bomb release mechanism of claim 16, wherein said controller and said second controller and independently programmable and wherein said controller and said second controller each independently determine whether an appropriate signal has been transmitted for releasing said model bomb or said second model bomb.

* * * * *